United States Patent
Jahn et al.

(10) Patent No.: US 7,625,199 B2
(45) Date of Patent: Dec. 1, 2009

(54) PLASTIC FILTER

(75) Inventors: Herb Jahn, Scarborough (CA); Perry Rizzo, Bradford (CA); Rocco Di Serio, Scarborough (CA)

(73) Assignee: Axiom Group Inc., Ontario (CA)

( * ) Notice: Subject to any disclaimer, the term of this patent is extended or adjusted under 35 U.S.C. 154(b) by 590 days.

(21) Appl. No.: 10/939,631

(22) Filed: Sep. 13, 2004

(65) Prior Publication Data

US 2006/0057244 A1 Mar. 16, 2006

(30) Foreign Application Priority Data

Sep. 10, 2004 (CA) .................................. 2481143

(51) Int. Cl.
- B29C 45/00 (2006.01)
- C08J 5/00 (2006.01)
- B28B 17/00 (2006.01)
- B22C 9/00 (2006.01)
- B01D 35/28 (2006.01)

(52) U.S. Cl. ................ 425/190; 425/577; 249/60; 264/328.12; 264/DIG. 48; 210/499

(58) Field of Classification Search ............... 210/166, 210/162; 425/521, 512; 264/453
See application file for complete search history.

(56) References Cited

U.S. PATENT DOCUMENTS

| 5,076,924 | A | 12/1991 | Persson et al. |
|---|---|---|---|
| 5,171,430 | A | 12/1992 | Beach et al. |
| 5,175,008 | A * | 12/1992 | Ueno .......................... 425/178 |
| 5,423,893 | A * | 6/1995 | Kotaki ......................... 55/511 |
| 5,510,065 | A * | 4/1996 | McFarlane ................. 264/40.5 |
| 5,650,181 | A | 7/1997 | Kotaki |
| 6,379,143 | B1 | 4/2002 | Kotaki |
| 6,641,382 | B2 * | 11/2003 | Mine ......................... 425/116 |
| 6,673,283 | B2 * | 1/2004 | Coel et al. ................. 264/40.5 |
| 2004/0130071 | A1 * | 7/2004 | Chen ...................... 264/328.12 |
| 2007/0053812 | A1 * | 3/2007 | Kawai et al. ................ 422/243 |

* cited by examiner

*Primary Examiner*—Krishnan S Menon
*Assistant Examiner*—Madeline Gonzalez
(74) *Attorney, Agent, or Firm*—Tarolli, Sundheim, Covell & Tummino LLP

(57) ABSTRACT

An injection molding die for a mold for fabricating a plastic filter component including a net, at least one supporting rib, and a frame. The molding die includes a plurality of net grooves including a first set of net grooves and a second set of net grooves intersecting at least some of the first set of net grooves. The plurality of net grooves are for receiving plastic for forming the net of the plastic filter component. At least one rib groove is contiguous and in flow communication with at least some of the net grooves. The at least one rib groove is deeper than the net grooves and is for forming the at least one supporting rib subdividing the net into at least two portions. A frame cavity around the net grooves is in flow communication therewith, for receiving plastic for forming the frame. At least one damming device extending into the mold and located to act as a restriction for controlling plastic flow therepast and into at least some of the net grooves.

35 Claims, 14 Drawing Sheets

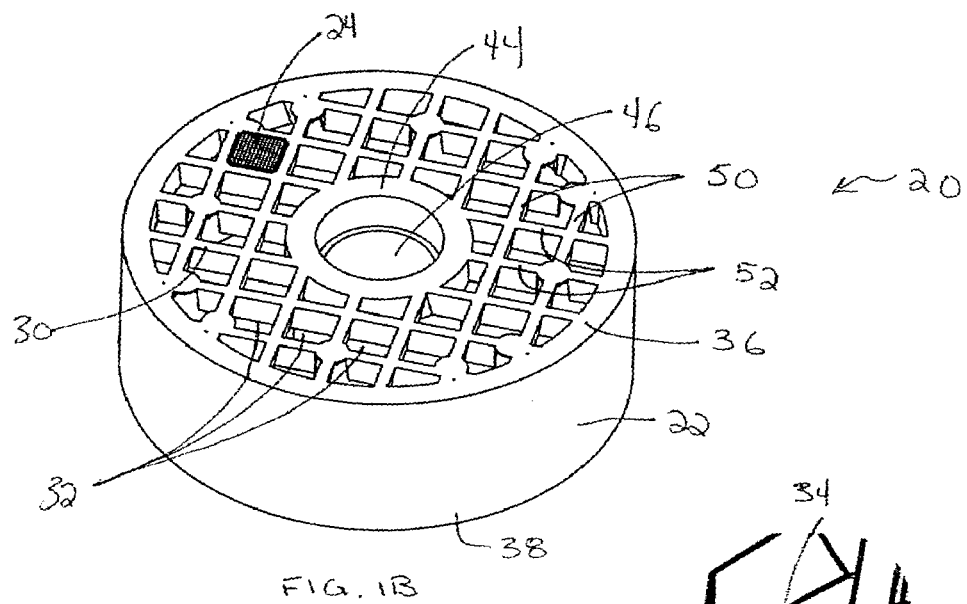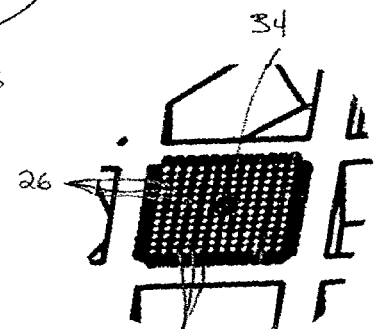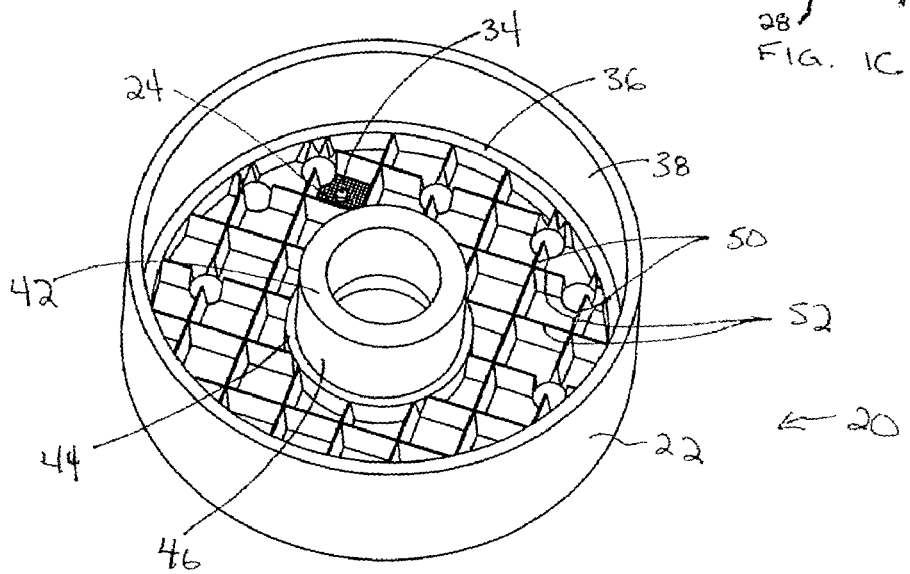

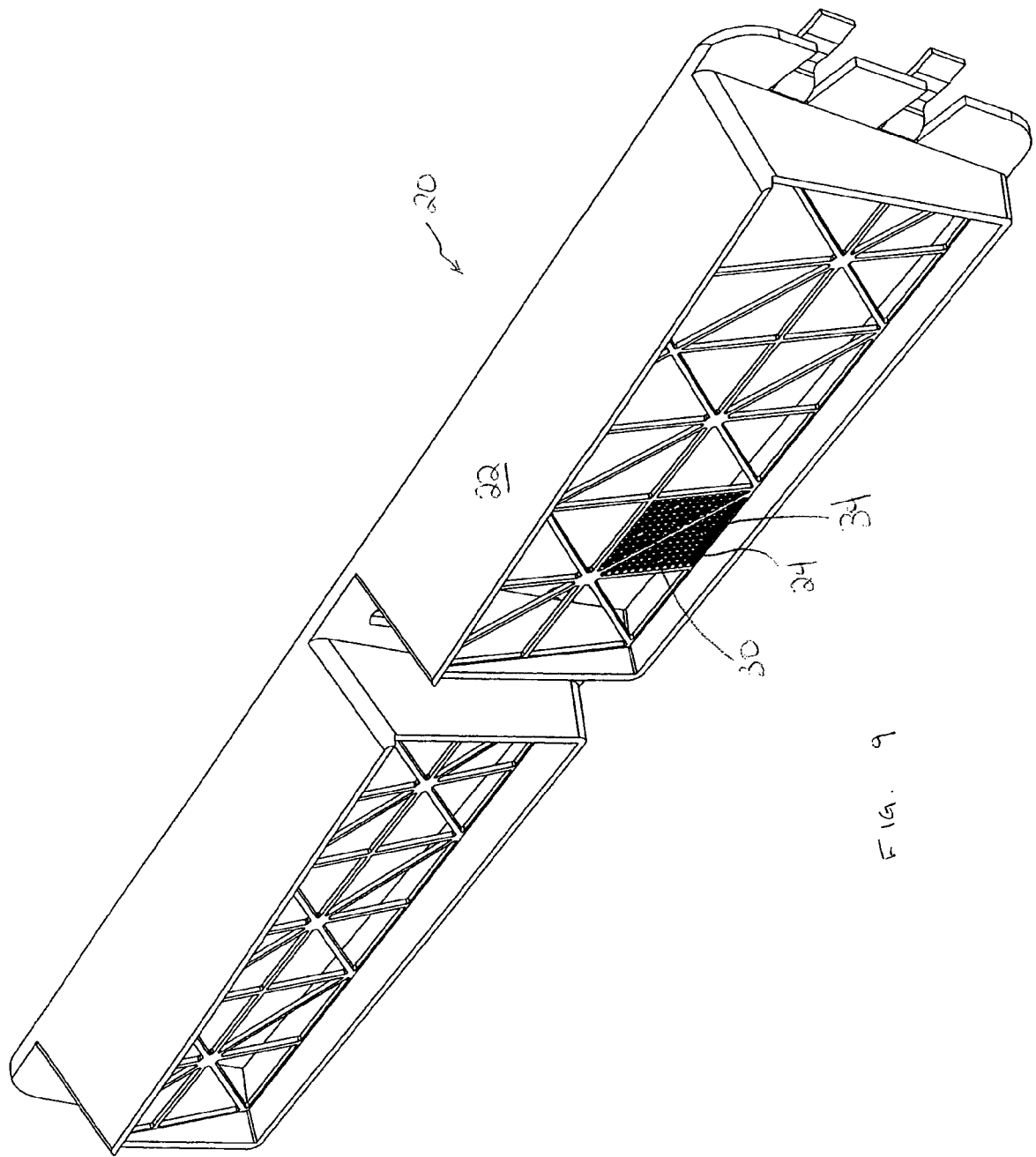

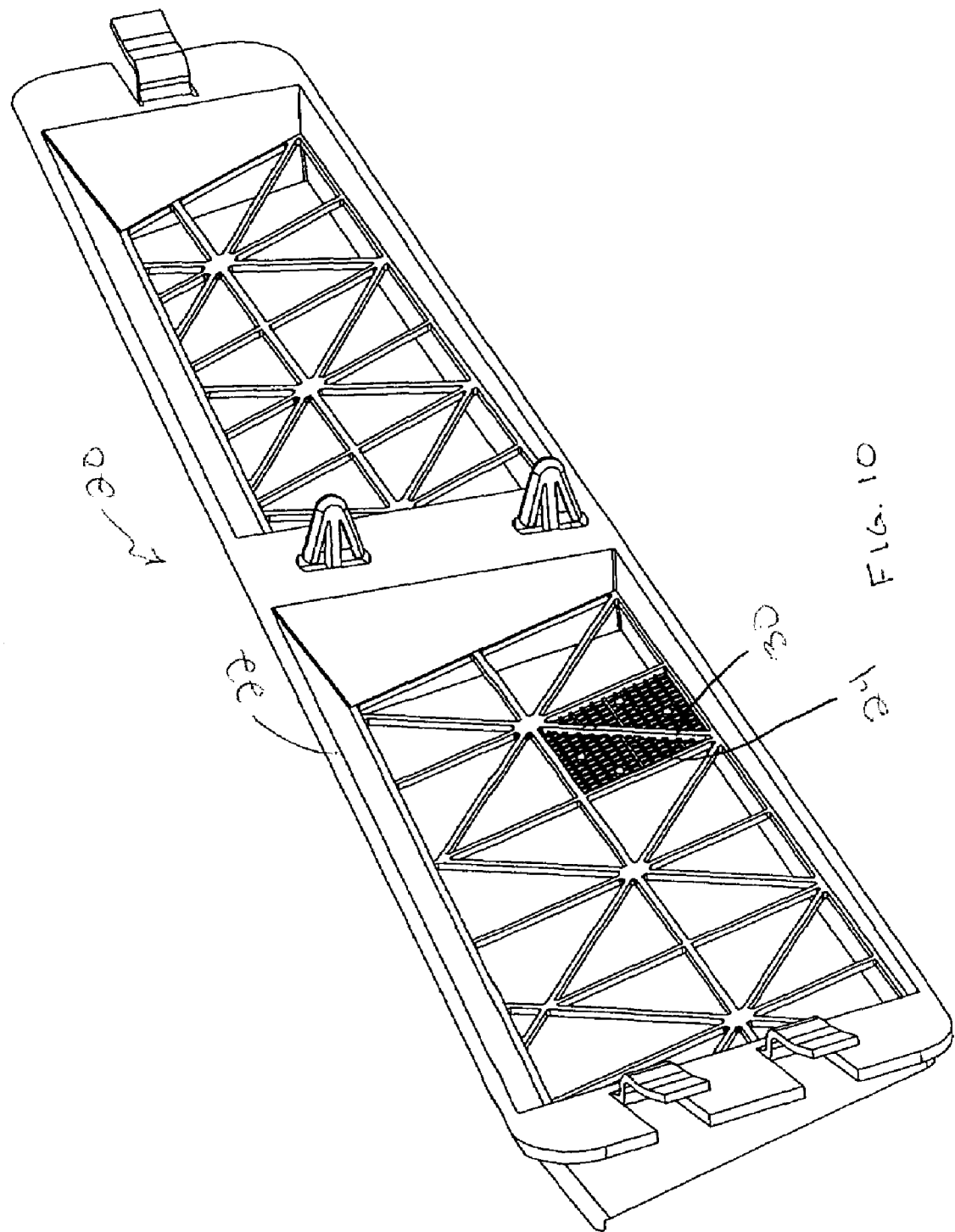

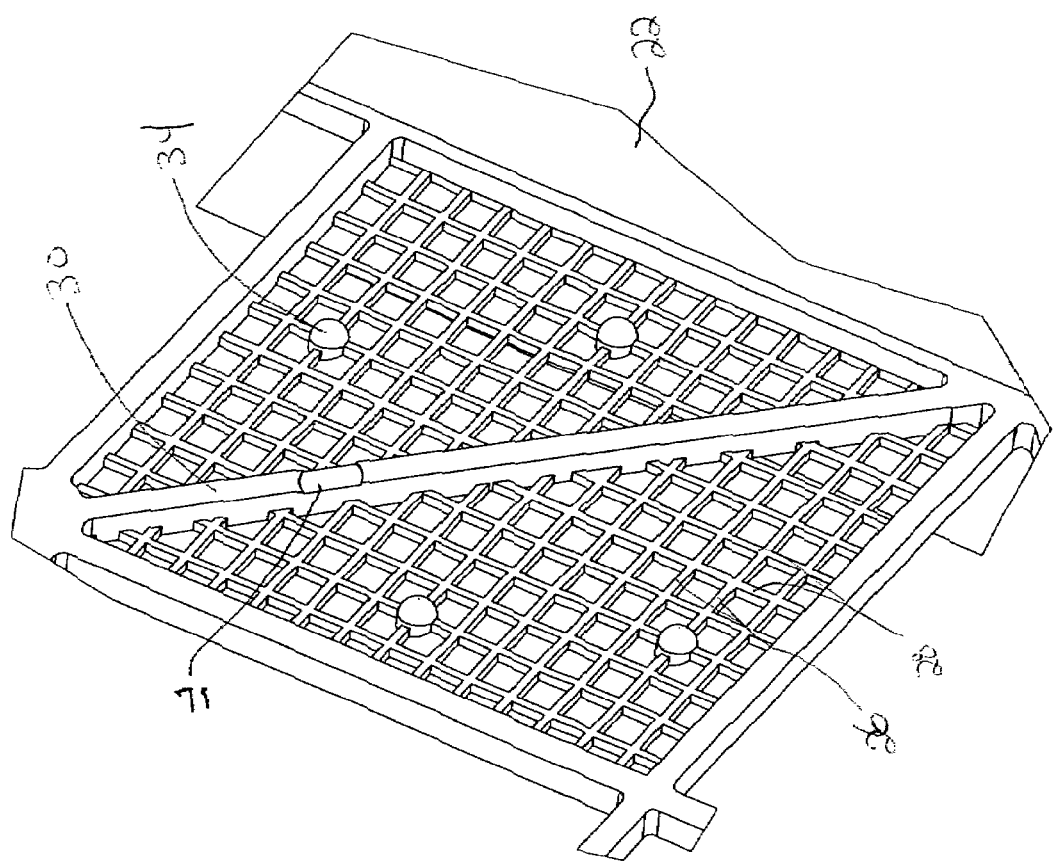

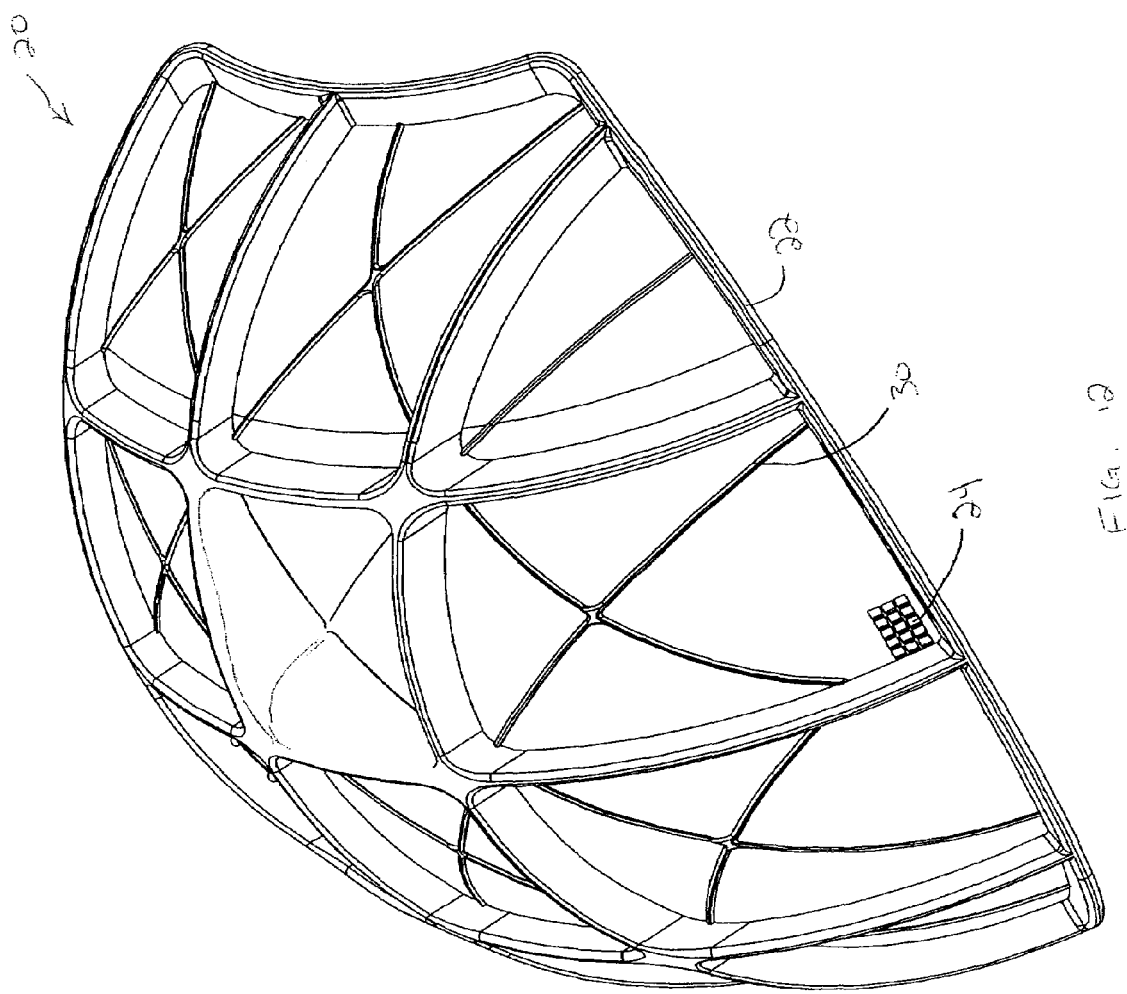

PLASTIC FILTER

FIELD OF THE INVENTION

The present invention relates in general to plastic filters and screens, and more particularly to injection molded fine-meshed filters and screens for use in, for example, engine lubricant, fuel, coolant and air systems.

BACKGROUND OF THE INVENTION

Precision plastic filters with a fine mesh, such as 300 micron plastic filters, are known for filtering contaminants in a variety of applications including lubricant, fuel, coolant and air systems. Such filters include a meshed net in a cup or frame and ribs spanning the cup to provide support to the meshed net.

Conventional filters are produced using a net and a frame that are produced separately. The net is then cut and fitted on the frame, followed by insert molding to fix the net to the frame. While such structures have been used in a variety of applications, they suffer from disadvantages. One of the disadvantages that these structures suffer is that the net and frame are manufactured separately and are joined in yet another manufacturing step. Thus, several manufacturing steps are needed in the production of these filters, which increases time and complexity of manufacture and therefore increases the manufacturing cost.

While injection molding is useful in manufacturing many plastic articles, such a method has not found use in manufacturing precision plastic filters. Injection molding has been found to be impractical due to difficulties in achieving uniform distribution of plastic resin material over an entire die during molding. Prior attempts at injection molding for producing precision plastic filters have been unsuccessful at keeping a consistent pattern, frame and surrounding cup.

In order to address the problems with injection molding of precision plastic filters, variations such as vacuum molding and gas assisted pressure molding have been proposed. Vacuum molding involves the creation of a vacuum in the mold space prior to injection of the plastic. This provides a pressure difference to draw the plastic into the mold space and thereby fill the mold space. In gas assisted pressure molding, the plastic is injected into the mold at high pressure to push the plastic into the mold space and cause the plastic to fill the mold space. These molding methods suffer disadvantages, however. In particular, these molding methods require non-conventional equipment that requires additional capital expense.

Accordingly, it is desirable to provide a method and apparatus for manufacturing a precision plastic filter that obviates or mitigates at least some of the disadvantages of the prior art.

SUMMARY OF THE INVENTION

According to one aspect of the present invention, there is provided an injection molding die for a mold for fabricating a plastic filter component including a net, at least one supporting rib, and a frame. The molding die includes a plurality of net grooves including a first set of net grooves and a second set of net grooves intersecting at least some of the first set of net grooves. The plurality of net grooves are for receiving plastic for forming the net of the plastic filter component. At least one rib groove is contiguous and in flow communication with at least some of the net grooves. The at least one rib groove is deeper than the net grooves and is for forming the at least one supporting rib subdividing the net into at least two portions. A frame cavity around the net grooves is in flow communication therewith, for receiving plastic for forming the frame. At least one restriction located so as to control plastic flow therepast and into at least some of the net grooves.

According to another aspect of the present invention, there is provided an injection molded plastic filter component. The injection molded plastic filter component includes a frame and a filter net interior of the frame and unitary therewith. The filter net includes a first set of filter strands and a second set of filter strands. The second set of filter strands intersect at least some of the first set of filter strands. At least one rib is adjacent the filter net for supporting the filter net and subdividing the filter net into at least two portions. At least one overflow dimple is disposed in at least one of the portions.

According to still another aspect of the present invention, there is provided a method of fabricating a plastic filter component. The method includes: closing a molding die of an injection molding machine, the molding die including a plurality of net grooves including a first set of net grooves and a second set of net grooves intersecting at least some of the first set of net grooves, the plurality of net grooves for receiving plastic for forming the net of the plastic filter component, at least one rib groove contiguous and in flow communication with at least some of the net grooves, the at least one rib groove being deeper than the net grooves, the at least one rib groove for forming the at least one supporting rib subdividing the net into at least two portions, a frame cavity around the net grooves and in flow communication therewith, for receiving plastic for forming the frame, and at least one restriction located so as to control plastic flow therepast and into at least some of the net grooves; injecting plastic into the molding die; cooling the plastic in the molding die; and opening the molding die to remove the plastic filter component therefrom.

Advantageously, a precision plastic filter component is manufactured by injection molding of the cup, filter and ribs of the filter component, in a single shot of the injection molding machine. The plastic filter component is manufactured using a conventional injection molding machine, thereby reducing manufacturing costs over prior art methods.

BRIEF DESCRIPTION OF THE DRAWINGS

The present invention will be better understood with reference to the drawings, and to the following description, in which:

FIG. 1A is a perspective view of a precision plastic filter component according to one embodiment of the present invention;

FIG. 1B is an alternative perspective view of the precision plastic filter component of FIG. 1A;

FIG. 1C is a perspective view of a portion of the precision plastic filter component of FIG. 1, drawn to a larger scale;

FIG. 9 is a perspective view of a precision plastic filter component according to another embodiment of the present invention;

FIG. 10 is an alternative perspective view of the precision plastic filter component of FIG. 9;

FIG. 11 is a perspective view of a portion of the precision plastic filter component of FIG. 9, drawn to a larger scale;

FIG. 12 is a perspective view of a precision plastic filter component of yet another embodiment of the present invention.

DETAILED DESCRIPTION OF THE PREFERRED EMBODIMENTS

Figure 2:
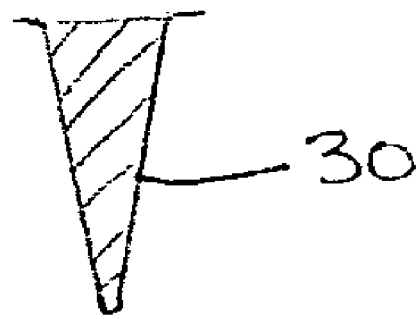
FIG. 2 is a sectional side view of a rib portion of the precision plastic filter component of FIG. 1A, drawn to a larger scale.

Reference is made to FIGS. 1A, 1B and 1C to describe an injection molded precision plastic filter component according to one embodiment of the present invention and generally indicated by the numeral 20. The plastic filter component 20 includes a frame 22 and a filter net 24 interior of the frame 22 and unitary therewith. The filter net 24 includes a first set of filter strands 26 and a second set of filter strands 28. The second set of filter strands 28 intersect some of the first set of filter strands 26. Ribs 30 are adjacent the filter net 24 for supporting the filter net 24 and subdividing the filter net 24 into at least two portions 32. At least one overflow dimple 34 is disposed in at least one of the portions 32.

The plastic filter component 20 will now be further described with reference to FIGS. 1A, 1B, and 1C. The plastic filter component 20 includes the frame 22 which is generally cylindrically shaped and surrounds the periphery of the filter net 24 such that the filter net 24 and ribs are connected to and unitary with one end of frame 22. It will be understood that although only a portion of the filter net 24 is shown for the purpose of clarity, the filter net 24 extends across the interior of the frame 22. As shown, the plastic filter component 20 of the present embodiment is generally cup-shaped. The frame 22 includes two cylindrical portions of decreasing wall thickness in stepwise fashion as the internal diameter of the frame 22 increases from the first portion 36 to the second portion 38. The filter net 24 and ribs 30 are attached to and unitary with the end of the first portion 36 and the second portion 38 is spaced from the filter net 24 and ribs 30. The external diameter of the frame 22 remains generally constant through both portions 36, 38.

A cylindrically shaped interior frame 42 is concentric with the frame 22 and is surrounded by the filter net 24. Thus, the filter net 24 radiates outwardly from the interior frame 42, extending between the interior frame 42 and the frame 22. Clearly the interior frame 42 and the frame 22 border the inner and outer edges, respectively, of the filter net 24. As best shown in FIG. 1A, the interior frame 42 includes two cylindrical portions, decreasing in wall thickness in stepwise fashion as the external diameter of the interior frame 42 decreases from the first portion 44 to the second portion 46. The filter net 24 and ribs 30 are attached to and unitary with the end of the first portion 44 and second portion 46 is spaced from the filter net 24 and ribs 30. The interior diameter of the interior frame 42 also decreases in stepwise fashion from the first portion 44 to the second portion 46.

As shown, the ribs 30 include a first set of generally parallel and spaced apart ribs 50 and a second set of generally parallel and spaced apart ribs 52. As shown, the second set of ribs 52 are generally perpendicular to the first set of ribs 50 and therefore the ribs 30 of the second set of ribs 52 intersect ribs 30 of the first set of ribs 50 at right angles. All of the ribs 30 extend adjacent and unitary with the filter net 24, inside the frame 22. Depending on the location of the ribs 30, some of these ribs 30 extend from an interior position along the first portion 36 of the frame 22 to the first portion 44 of the interior frame 42. The reminder of the ribs 30 extend within the interior of the cup, but stop short of extending to meet the frame 22. These ribs 30 are interrupted from extending all the way to the frame 22 by restrictions in the form of dam pins in the injection molding die during fabrication, as will be further referred to in the following description. It will be understood that the ribs 30 provide support for the filter net 24.

Each rib 30 has a generally V-wedge shaped cross-section with the wide, top portion of the V adjacent and unitary with the filter net 24, as shown in FIG. 2. The thin, bottom portion of the V-wedge shaped rib 30 points away from the filter net 24, inwardly into the cup.

Reference is again made to FIGS. 1A, 1B and 1C. As indicated above, the filter net 24 extends inside of the frame 22, with the first portion 36 of the frame being unitary with and surrounding the periphery of the filter net 24. The filter net 24 includes the first set of filter strands 26 that are generally parallel and spaced apart and the second set of filter strands 28 that are generally parallel and spaced apart. As shown, the second set of filter strands 28 are generally perpendicular to the first set of filter strands 26 and therefore the strands from the first set of filter strands 26 intersect strands from the second set of filter strands 28, at right angles. Clearly the filter net 24 is mesh-like, with small holes between the strands 26 and 28. In the present embodiment, the small holes are a maximum of 300 microns in width.

Figure 3:
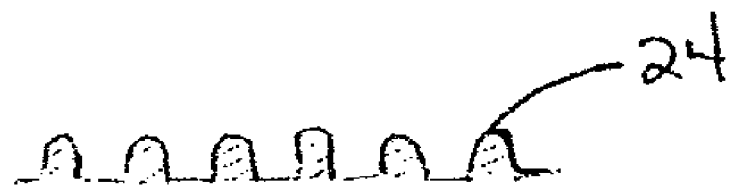
FIG. 3 is a section side view of a filter net portion of the precision plastic filter component of FIG. 1A, drawn to a larger scale.

Each of the strands 26, 28 of the filter net 24 have a cross-section that is generally parabolic segment shaped, as shown in FIG. 3. The curved side of each of the parabolic segment shaped strands faces away from the cup and the generally flat side of each of the strands faces inwardly towards the interior of the cup.

Clearly the ribs 30 are much larger than the filter strands 26, 28 and are fewer in number, as shown in FIGS. 1A and 1B. Thus, the ribs 30 support the filter net 24 and subdivide the filter net 24 into small square portions or partial square portions of the filter net 24. Many of the portions include an overflow dimple 34 on and unitary with the filter net 24, resulting from the die shape. The overflow dimples 34 are used for receiving plastic overflow and entrapped gas during molding.

Figure 4A:
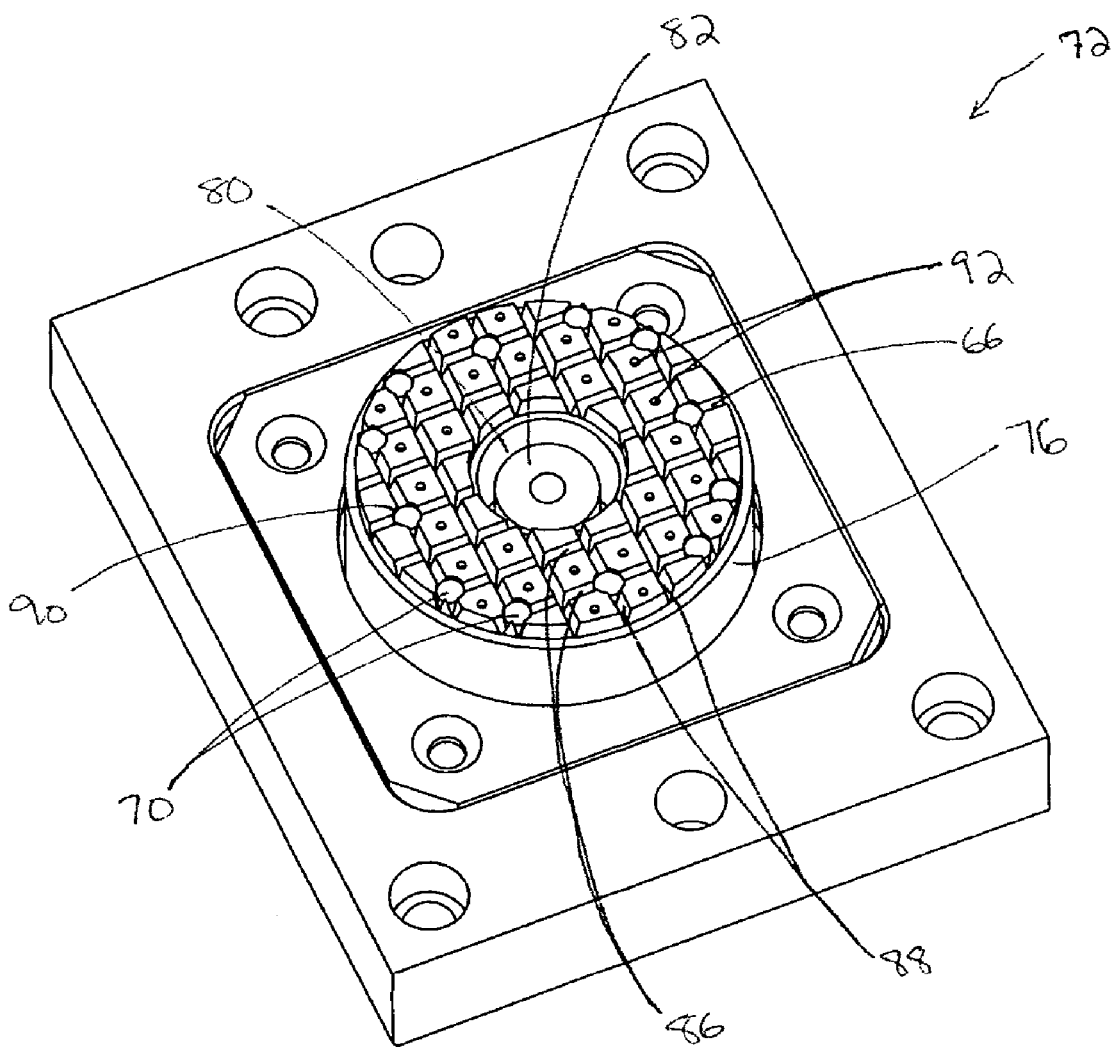
FIG. 4A is a perspective view of a core side of a die for fabricating the filter component of FIG. 1A.
Figure 4B:
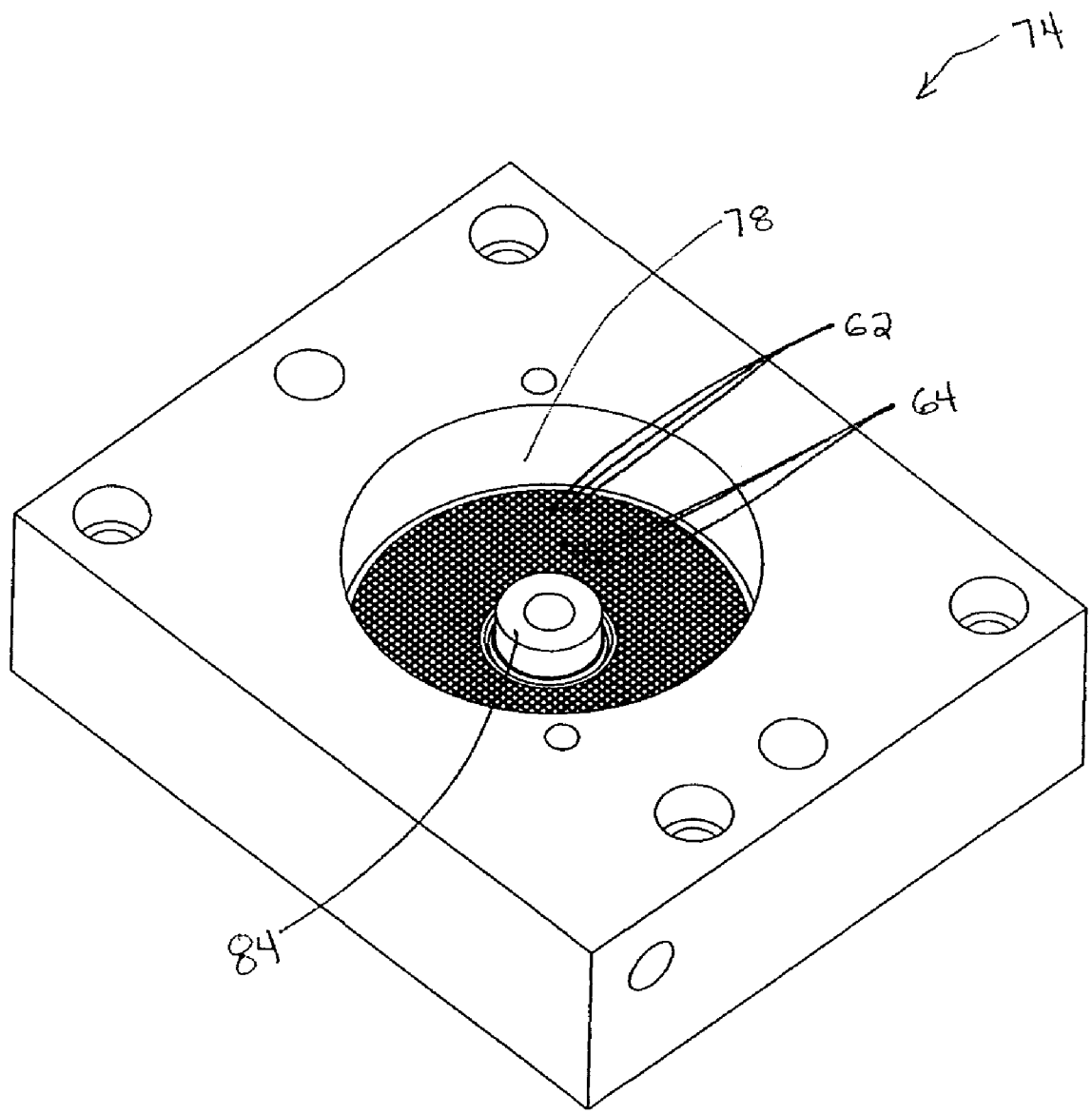
FIG. 4B is a perspective view of a cavity side of the die for fabricating the filter component of FIG. 1A.

The molding die for fabricating the plastic filter component 20 will now be described with reference to FIGS. 4A and 4B. The die for a mold (molding die) for fabricating the plastic filter component 20 includes a plurality of net grooves including a first set of net grooves 62 and a second set of net grooves 64 intersecting at least some of the first set of net grooves 62. The plurality of net grooves 62, 64 are for receiving plastic for forming the filter net 24 of the plastic filter component 20. Rib grooves 66 are contiguous and in flow communication with at least some of the net grooves 62, 64. The rib grooves 66 are deeper than the net grooves 62, 64 and are for forming the ribs 30, subdividing the resultant net into portions. A frame cavity around the periphery of the net grooves 62, 64 is in flow communication therewith, for receiving plastic for forming the frame 22. At least one restriction is located for controlling plastic flow therepast and into at least some of the net grooves 62, 64. In the present embodiment, the at least one restriction includes a plurality of dam pins 70.

The molding die will now be further described with reference to the particular embodiment shown in FIGS. 4A and 4B. Two sides of the molding die, referred to as a core side 72 and a cavity side 74, are shown in the Figures. The two sides 72, 74 are closed together in an injection molding apparatus (not shown) to form the mold cavity into which liquid plastic is injected to form the plastic filter component 20. It will be appreciated that the features of the molding die relate to the resulting features in the plastic filter component 20. Thus, the function and elements of the molding die, shown in FIGS. 2A and 2B, will be better understood with reference as well to FIGS. 1A and 1B, as described above.

When the core side 72 and the cavity side 74 are closed together for molding the filter component 20, a frame cavity is created between the two sides 72, 74. In particular, the core side 72 includes a generally cylindrical protrusion 76 that fits inside and concentric with a generally cylindrical cavity 78 in the cavity side 74 of the molding die. Clearly, the diameter of the cylindrical protrusion 76 is less than the diameter of the cylindrical cavity 78, thereby leaving the frame cavity between the two sides 72, 74. It will be understood that plastic flows into the frame cavity to form the frame 22 during fabrication of the filter component 20.

The cylindrical protrusion 76 includes two cylindrical portions of increasing diameter in stepwise fashion, with distance from an outer surface of the protrusion 76. It will be understood that these two cylindrical portions correspond with and result in the first and second portions 36, 38, respectively of the filter component 20.

A generally cylindrical interior frame groove 80 is provided in the cylindrical protrusion 76 on the core side 72 of the molding die and is concentric therewith. When the core side 72 and cavity side 74 of the die are closed together for fabricating the filter component 20, a central portion 82 of the cylindrical protrusion 76, inside the cylindrical interior frame groove 80 abuts a generally cylindrical central protrusion 84 on the cavity side 74 of the die. Clearly, the interior frame groove 80 is complementary in size and shape to the interior frame 42 of the filter component 20. Thus, plastic is injected into the interior frame groove 80 to form the interior frame 42 during fabrication of the filter component 20.

Figure 5:
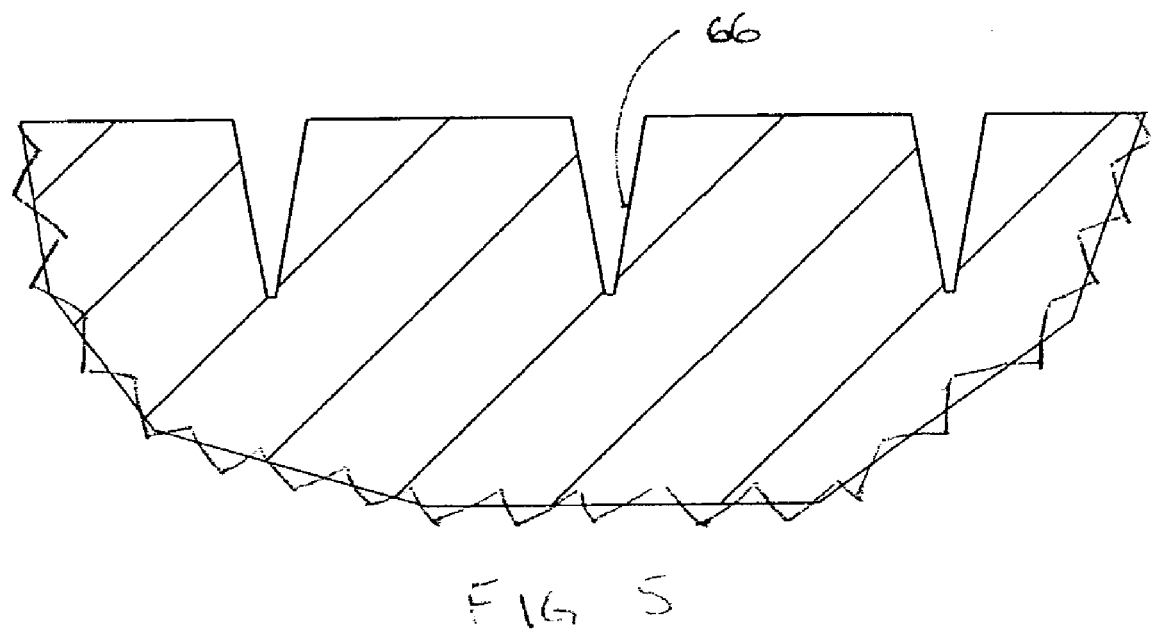
FIG. 5 is a sectional side view of a portion including rib grooves, of the core side of the die of FIG. 4A, drawn to a larger scale.

Referring to the core side 72 of the molding die, the rib grooves 66 include a first set of generally parallel and spaced apart rib grooves 86 and a second set of generally parallel and spaced apart rib grooves 88 all located in the surface of the cylindrical protrusion 76. As shown, the second set of rib grooves 88 are generally perpendicular to the first set of rib grooves 86 and therefore the second set of rib grooves 88 intersect the first set of rib grooves 86 at right angles. Clearly the first set of rib grooves 86 and the second set of rib grooves 88 correspond with the first set of ribs 50 and the second set of ribs 52, respectively, of the filter component 20. Thus, each of the rib grooves 66 has a generally V-wedge shaped cross-section, with the wide top portion of the V at the surface of the cylindrical protrusion 76, as shown in FIG. 5. Some of the rib grooves 66 extend between the frame cavity and the interior frame groove 80. The remainder of the rib grooves 66 extend across the cylindrical protrusion 76, but not all the way to the frame cavity. These rib grooves 66 are interrupted from extending all the way to the frame cavity by restrictions in the form of dam pins 70 that extend into the mold cavity, through holes 90. As shown, eight holes 90 are located in the cylindrical protrusion 76, at the periphery thereof. Thus, the dam pins 70 extend into the mold cavity, adjacent the frame cavity. Each of the dam pins 70 is adjustable to modify the spacing between the end of the dam pin 70 and the cavity side 74 of the molding die. This adjustment creates an adjustable restriction in the flow of the melt to thereby increase or decrease the velocity of the melt during filling of the mold cavity, particularly into the first and second set of net grooves 61, 64. The dam pins 70 are also useful for providing an area for gas to vent down as the gas escapes through a clearance between the holes 90 and the respective dam pins 70. The gas travels the length of the pin, away from the net grooves.

The rib grooves 66 subdivide the surface of the cylindrical protrusion 76 into small square portions or partial square portions. Many of the portions include a small overflow pocket 92 that is semi-spherical in shape, therein. The each overflow pocket 92 corresponds with one of the overflow dimples 34 in the resulting filter component 20. The overflow pockets 92 receive entrapped gas and melt overflow during injection molding of the filter component 20.

The cavity side 74 of the molding die includes the first and second set of net grooves 62, 64, respectively, in the surface of the cylindrical cavity 78. The first set of net grooves 62 includes grooves that are generally parallel and spaced apart. As shown, the second set of net grooves 64 includes grooves that are generally parallel and spaced apart and that are generally perpendicular to the first set of net grooves 62. Clearly the first and second set of net grooves 62, 64 correspond with the first and second set of filter strands 26, 28, respectively.

Figure 6:
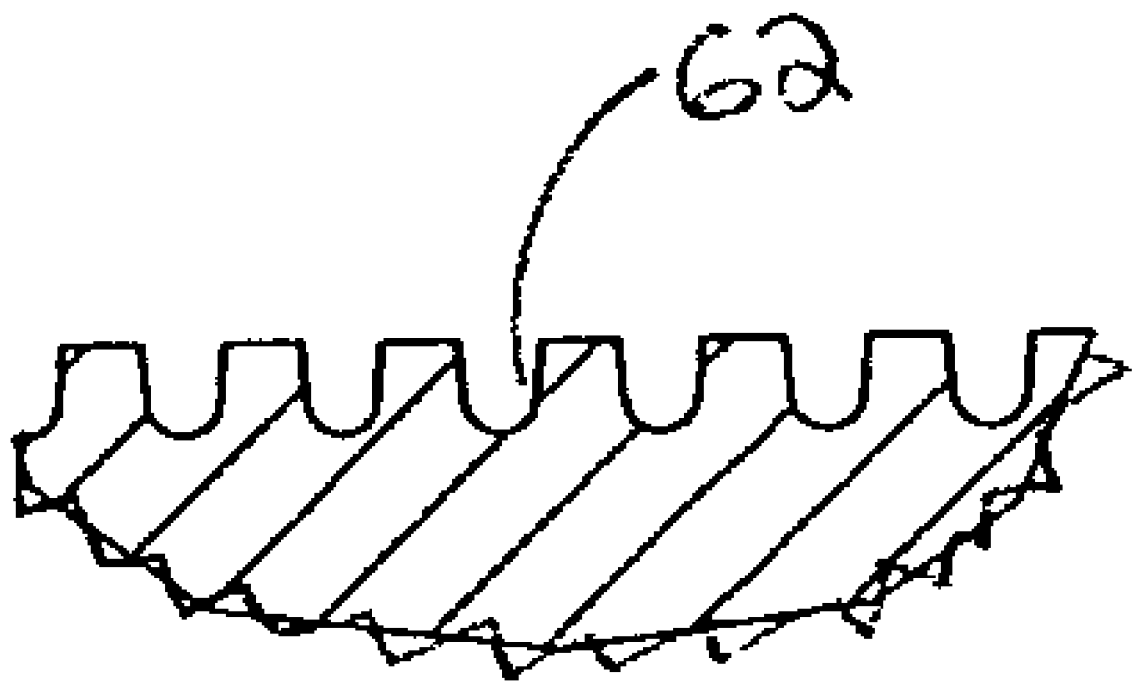
FIG. 6 is a sectional side view of a portion including filter net grooves, of the cavity side of the die of FIG. 4B, drawn to a larger scale.

Each of the first set of net grooves 62 has a cross-section that is generally parabolically shaped to result in the parabolic segment shaped strands 26 of the filter net 24, as shown in FIG. 6. Each of the second set of net grooves 64 has a similar cross-section to that of the first set of net grooves 62.

As stated above, the core side 72 and cavity side 74 of the die are closed together in an injection molding apparatus (not shown) to form the mold cavity into which liquid plastic is injected to form the plastic filter component 20. Although the first and second set of net grooves 62, 64 are located on the cavity side 74 of the die while the rib grooves 66 and overflow pockets 92 are located on the core side 72 of the die, it will be appreciated, that these features are side by side and in flow communication within the molding die. Thus, when plastic is injected into the mold, the filter net 24 is adjacent and unitary with the ribs 30 and the overflow dimples 34.

In use, the dam pins 70 are adjusted to regulate the velocity of the melt during filling of the mold cavity and to ensure that the first and second set of net grooves 62, 64 are filled with plastic during injection molding. The molding die is closed within an injection molding apparatus by mating the core and cavity sides 72, 74 of the molding die such that the cylindrical protrusion 76 is inserted into the cylindrical cavity 78. Next, liquid plastic is injected into the molding die and then cooled. In the present embodiment the plastic is a high flow rate nylon (nylon with additive for increasing flow). The plastic then cools and the molding die is opened by separating the core and cavity sides 72, 74, to remove the plastic filter component 20 therefrom.

Figure 7A:
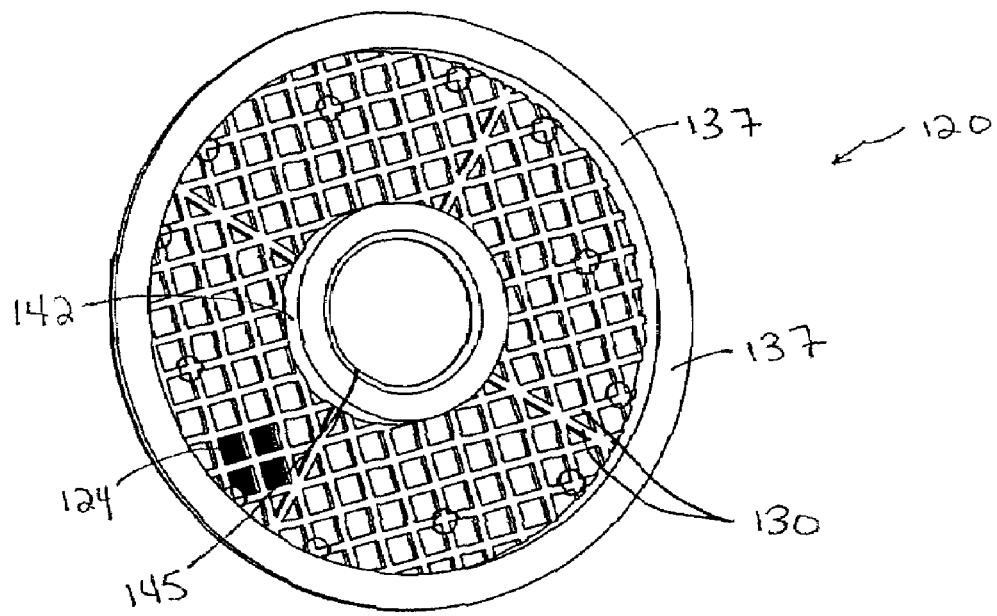
FIG. 7A is a perspective view of a precision plastic filter component according to another embodiment of the present invention.
Figure 7B:
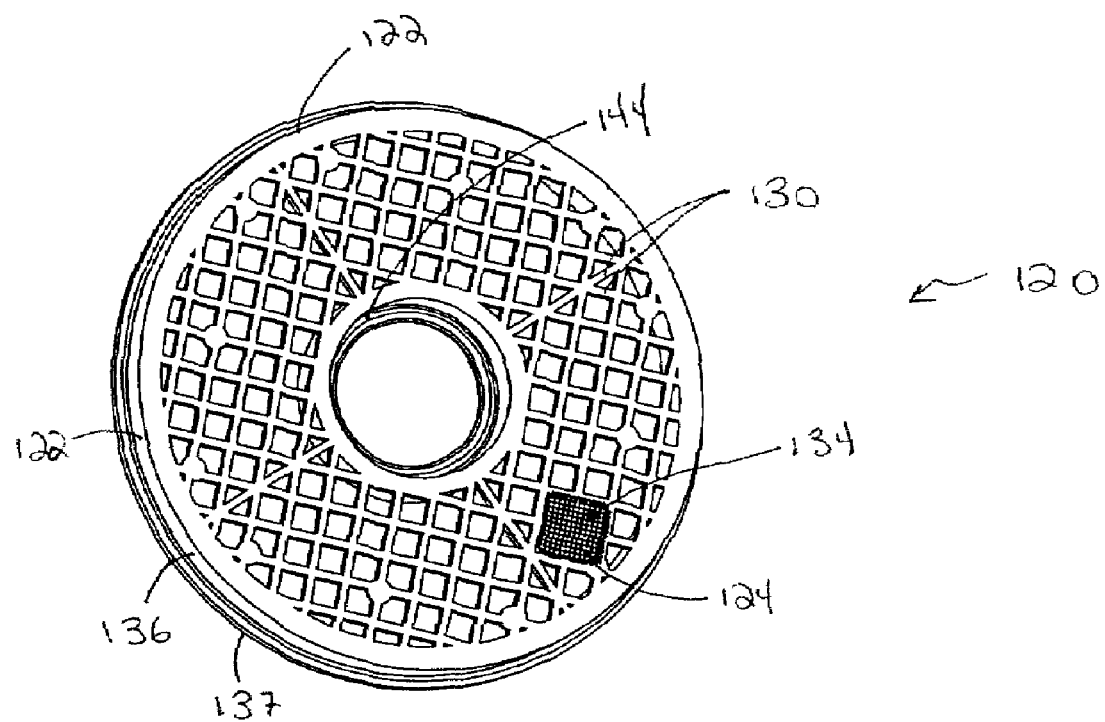
FIG. 7B is an alternative perspective view of the precision plastic filter component of FIG. 7A.

Reference is now made to FIGS. 7A and 7B to describe an injection molded plastic filter component according to another embodiment of the present invention. For the purpose of clarity, the numerals used previously in describing the above embodiment, will again be used after raising these numerals by 100. Thus, the filter component in the present embodiment is referred to generally by the numeral 120. FIGS. 7A and 7B show only a portion of the filter net for the purpose of clarity. It will be understood, however, that the filter net extends interior of the frame 122 to the interior frame 142.

The plastic filter component 120 of the present embodiment actually forms a top for the plastic filter component 20 of the first described embodiment. Many of the components of the present embodiment are similar to those of the first described embodiment and are therefore not described further herein.

The frame 122 is generally cylindrically shaped but, unlike the first described embodiment, includes only a single smaller cylindrical portion 136 with an outer lip 137 around the open end. Similarly, the cylindrically shaped interior frame 142 includes only a single cylindrical portion 144 with an inner lip 145.

The plastic filter component 120 of the present embodiment is sized and shaped to fit with the plastic filter component 20 of the first described embodiment. Thus, the frame 122 is sized to slide within the second portion 38 such that the outer lip 137 abuts the end of the second portion 38. Also, the cylindrical portion 144 of the interior frame 142 is sized to slide over the second portion 46 of the interior frame 42 such that the inner lip 145 abuts the end of the second portion 46.

While the number and size of some of the remaining features of the plastic filter component 120 differ from those of the first described embodiment, the features are similar in function. For example, the ribs 130 in the present embodiment are smaller than those of the first described embodiment and are greater in number. This results in a greater number of square portions and partial square portions of the filter net 124. The shape of the ribs 130, however, is similar to the shape of the ribs 30 of the first described embodiment. Also, four additional ribs 130 run radially from the interior frame 142 toward the frame 122.

The ribs 130 are interrupted due to the use of restrictions in the form of dam pins 170 that are located in different locations than in the first described embodiment and the dam pins 170 are smaller, resulting in smaller interruptions in the ribs 130.

Also, there are fewer overflow dimples 134. Since there is a greater number of square portions and partial square portions of the filter net 124, not every square portion and partial square portion includes an overflow dimple 134.

The filter net 124, however, is very similar to the filter net 24 of the first described embodiment and the size and shape of the first and second sets of filter strands 26, 28 are similar.

Figure 8A:
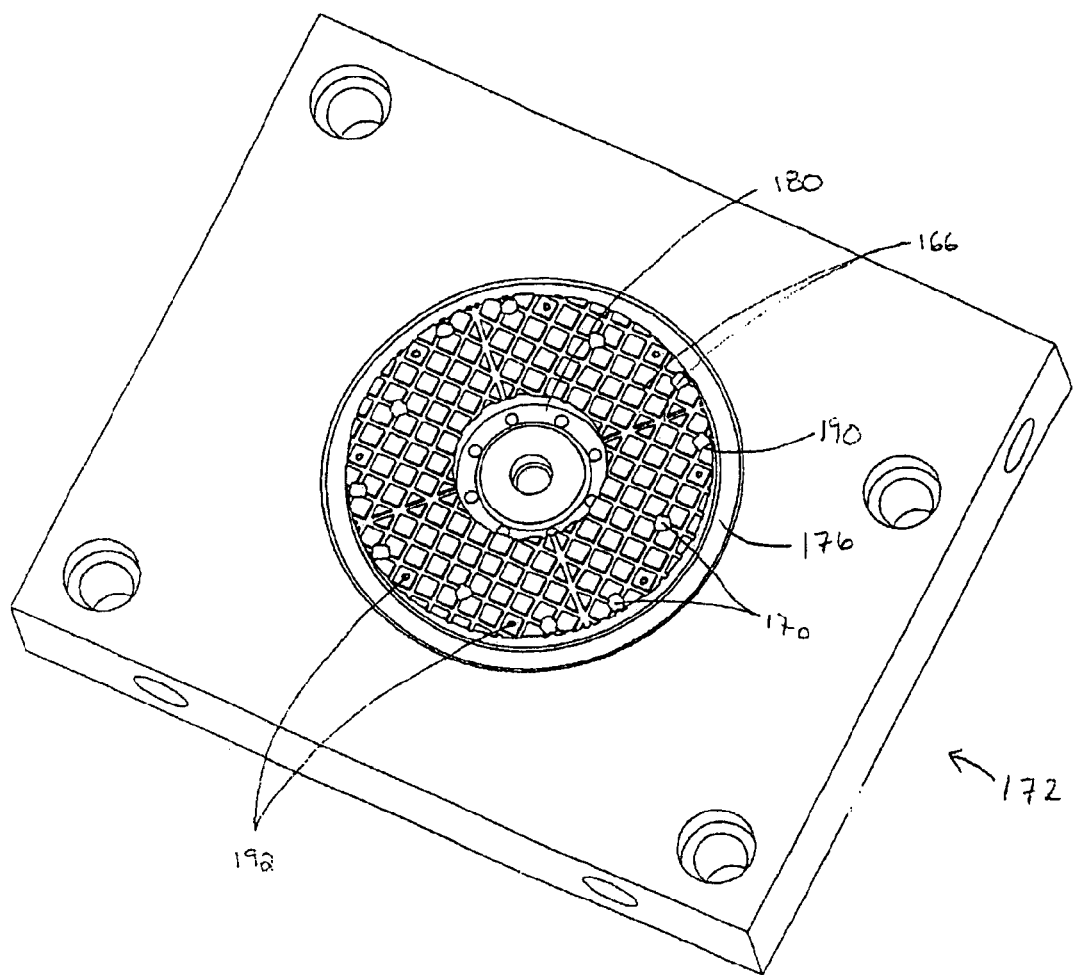
FIG. 8A is a perspective view of a core side of a die for fabricating the filter component of FIG. 7A.
Figure 8B:
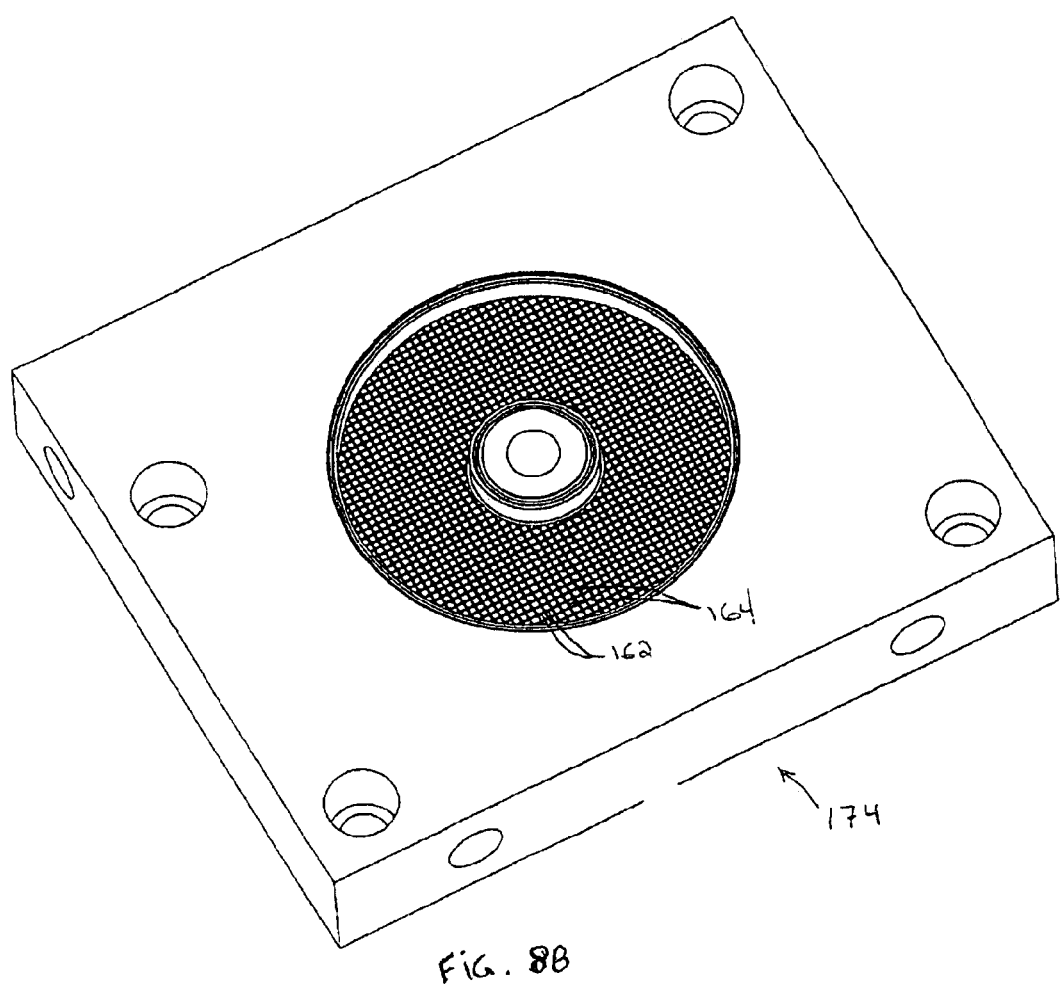
FIG. 8B is a perspective view of a cavity side of a die for fabricating the filter component of FIG. 7A.

Reference is now made to FIGS. 8A and 8B to describe a molding die for fabricating the plastic filter portion 120 described above. The molding die of the present embodiment is somewhat similar to the molding die of the first described embodiment and therefore is not described in detail herein. It will be appreciated that the frame cavity of the molding die of the present application includes a lip cavity portion for forming the outer lip 137. Similarly, the interior frame groove 180 includes an inner lip portion of the groove for forming the inner lip 145.

It will be understood that like the ribs 130 of the filter component 120, the rib grooves 166 are smaller than those of the first described embodiment and are greater in number. This results in a greater number of square portions and partial square portions of the filter net 124 in the filter component 120 that is fabricated using the core and cavity sides 172, 174 of the die of the present embodiment. The shape of the rib grooves 166 is similar to the shape of the rib grooves 66 of the first described embodiment. Also, an additional four rib grooves 166 run radially from the interior frame groove 180 toward the frame 122.

Although not located in the same positions and smaller than that in the first described embodiment, holes 190 are distributed through the cylindrical protrusion 176 on the core side 172 of the die. These holes 190 receive the dam pins 170 that interrupt the rib grooves 166 in various places. These dam pins 170 function as flow restrictions during molding, similar to the first embodiment.

Since there are fewer overflow dimples 134, it is clear that there are fewer overflow pockets 192 and, unlike the first described embodiment, there are many square portions and partial square portions of the core side 172 of the die that do not have overflow pockets 192 therein.

On the cavity side 174 of the die, the first and second set of net grooves 162, 164 are very similar to those of the first described embodiment and thus are not further described herein.

Although described in two different embodiments, the filter component 20 of the first described embodiment and the filter component 120 of the second described embodiment mate together in a sliding fit to form a single filter. The filter component 20 is filled with, for example, a dessicant, prior to mating with the filter component 120 to cap the filter component 20 (also referred to as the cup). The filter component 120 is then fixed to the filter component 20 using suitable means such as gluing, ultrasonic welding, heat staking or spin welding, to create a bond.

The present invention has been described by way of examples. Modifications and variations to the embodiments described herein may occur to those skilled in the art. For example, the size and shape of many of the features can vary while still performing the same function. For exemplary purposes, the dam pins 70, 170 described above are pins with a circular cross section. Other pin shapes are possible including, for example, a blade. Also, rather than using dam pins, it will be understood that the plastic filter component can be designed with ribs that have portions that are suitably sized and shaped to act as restrictions in the plastic flow. Further, it is not necessary that each filter component be made to mate with other filter components as a filter can be made of a single component.

Referring now to FIGS. 9, 10 and 11, there is shown a plastic filter component according to still another embodiment of the present invention. The numerals used previously in reference to the first described embodiment will be used again in referring to the plastic filter component 20 of the present embodiment. Although the size and shape of the filter component 20 of the present embodiment differs from the above-described embodiments, many features and functions thereof are similar. In the present embodiment, the plastic filter component is used as a screen in filtering air.

As in the first described embodiment, the plastic filter component 20 includes a frame 22, a filter net 24 that includes a first set of filter strands 26 and a second set of filter strands 28. The ribs 30 provide support to the filter net 24 and overflow dimples 34 are located on the filter net 24. In the present embodiment, the filter net 24 is subdivided into small triangular portions, each portion including a pair of spaced apart overflow dimples 34. Although not shown, it is clear that the core and cavity side of the die for fabricating the filter component 20 of the present embodiment, include corresponding features that result in the elements of the plastic filter component 20 when molded. In the present embodiment, a restriction is provided in the rib grooves in the form of a reduced cross-sectional area in the rib grooves, through which the plastic flows during molding. The resulting reduction in the rib 30 is shown in FIG. 11.

It will be appreciated that although the size and shape of many of the elements of the present embodiment differ from the size and shape of many of the elements described above, the functions of these elements are similar. Thus, these elements need not be further described herein.

Figure 13:
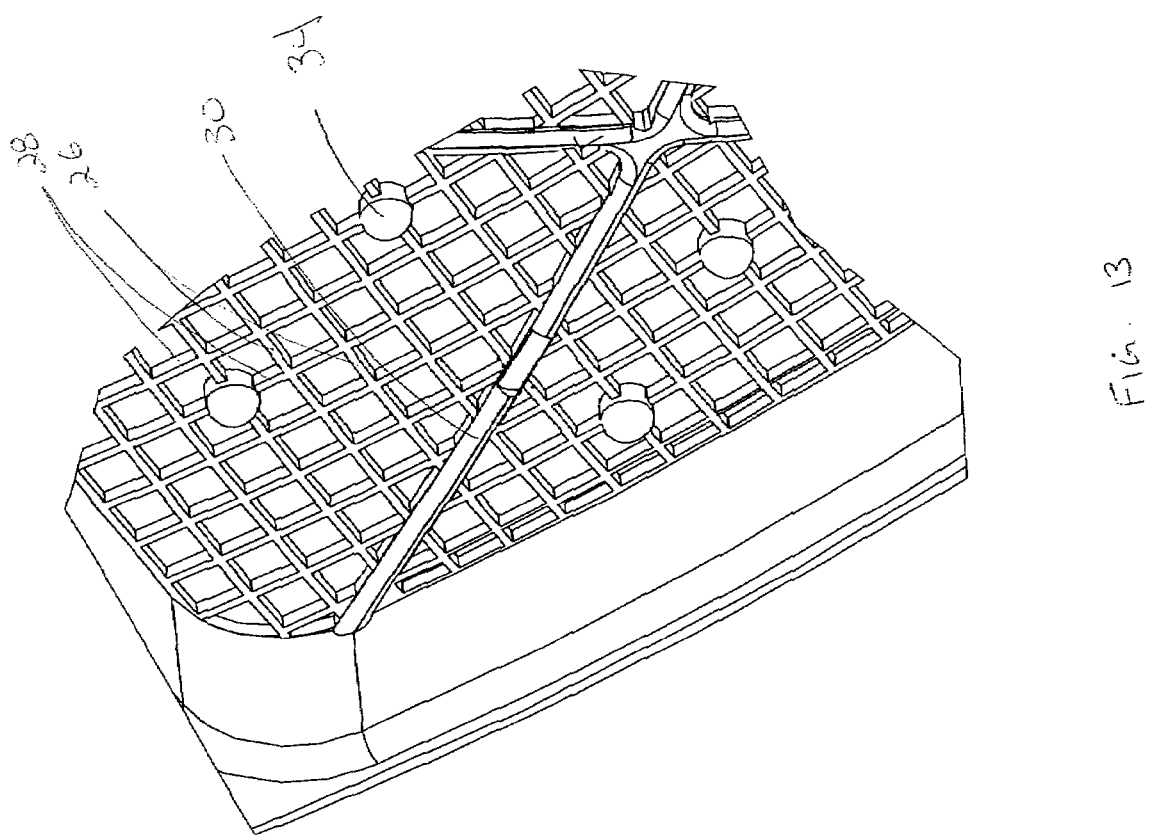
FIG. 13 is a perspective view of a portion of the precision plastic filter component of FIG. 12, drawn to a larger scale.

Reference is now made to FIGS. 12 and 13 to describe a plastic filter component according to yet another embodiment of the present invention. The numerals used previously in reference to the first described embodiment will be used again in referring to the plastic filter component 20 of the present embodiment. Again the size and shape of the filter component 20 of the present embodiment differs from the above-described embodiments. Many features and functions, however, are similar.

As in the first described embodiment, the plastic filter component 20 includes a frame 22, a filter net 24 that includes a first set of filter strands 26 and a second set of filter strands 28. The ribs 30 provide support to the filter net 24 and overflow dimples 34 are located on the filter net 24. In the present embodiment, the filter net 24 is subdivided into curved portions, each portion including a pair of spaced apart overflow dimples 34. Again, it is clear that the core and cavity side of the die for fabricating the filter component 20 of the present embodiment, include corresponding features that result in the elements of the plastic filter component 20 when molded.

Although the size and shape of many of the elements of the present embodiment differ from the size and shape of many of the elements described above, the functions of these elements are similar. Thus, these elements need not be further described herein.

It will be understood that the term filter when used herein is not limited to filters for use in filtering fluids in which fluid flow is reduced by the use of the filter. The term filter is intended to include screens for use in filtering fluids without substantial fluid flow reduction.

Still other modifications and variations may occur to those skilled in the art. All such modifications and variations are believed to be within the sphere and scope of the present invention.

What is claimed is:

1. An injection molding die for a mold for fabricating a plastic filter component comprising a net, at least one supporting rib, and a frame, the molding die comprising:
   a plurality of net grooves comprising a first set of net grooves and a second set of net grooves intersecting at least some of the first set of net grooves, the plurality of net grooves for receiving plastic material for forming the net of the plastic filter component;
   at least one rib groove contiguous and in flow communication with at least some of the net grooves, the at least one rib groove being deeper than said net grooves, said at least one rib groove for receiving plastic material for forming the at least one supporting rib of the plastic filter component and being dimensioned so that said at least one supporting rib divides said net into at least two isolated portions;
   a frame cavity around the net grooves and in flow communication therewith, for receiving plastic material for forming the frame of the plastic filter component; and
   at least one restriction positioned in said at least one rib groove, the depth of said at least one restriction in said at least one rib groove being adjustable to control plastic material flow therepast and into at least some of said net grooves.

2. The injection molding die according to claim 1, wherein said at least one restriction comprises a plurality of axially adjustable damming pins extending into the mold.

3. The injection molding die according to claim 1, further comprising:
   at least one overflow pocket communicating with selected ones of said net grooves for receiving overflow plastic material thereby to form an overflow dimple in at least one of said isolated portions of said plastic filter component.

4. The injection molding die according to claim 1, wherein said at least one rib groove comprises a plurality of rib grooves for forming a plurality of supporting ribs subdividing the net into a plurality of isolated portions, each of said plurality of rib grooves being contiguous and in flow communication with a plurality of said net grooves.

5. The injection molding die according to claim 1, wherein said at least one rib groove comprises a plurality of generally parallel first rib grooves and a plurality of generally parallel second rib grooves, each of said first rib grooves intersecting at least some of said second rib grooves for forming a plurality of supporting ribs subdividing the net into a plurality of isolated portions, each of said plurality of rib grooves being contiguous and in flow communication with a plurality of said net grooves.

6. The injection molding die according to claim 5, further comprising a plurality of overflow pockets communicating with selected ones of said net grooves, for receiving overflow plastic material thereby to form overflow dimples in respective ones of said isolated portions of said plastic filter component.

7. The injection molding die according to claim 1, wherein at least some of said net grooves have cross-sections that are generally parabolic in shape.

8. The injection molding die according to claim 4, wherein the frame cavity is cylindrically shaped.

9. The injection molding die according to claim 8, further comprising a cylindrically shaped interior frame groove concentric with said frame cavity, said net grooves and said rib grooves being located between said frame cavity and said interior frame groove.

10. The injection molding die according to claim 1, further comprising a gate in flow communication with said frame cavity for injecting plastic material into said frame cavity.

11. An injection molding die for a mold for fabricating a plastic filter component comprising a net, at least one supporting rib, and a frame, the molding die comprising:
   a core portion having a first surface;
   a cavity portion receiving the core portion and having a second surface in abutment with said first surface;
   a plurality of net grooves formed in at least one of said first and second surfaces, said net grooves comprising a first set of net grooves and a second set of net grooves intersecting at least some of the first set of net grooves, the plurality of net grooves for receiving plastic material for forming the net of the plastic filter component;
   at least one rib groove formed in at least one of said first and second surfaces, said at least one rib groove being contiguous and in flow communication with at least some of the net grooves, the at least one rib groove being deeper than said net grooves, said at least one rib groove for receiving plastic material for forming the at least one supporting rib of the plastic filter component;
   at least one plastic material overflow pocket formed in at least one of said first and second surfaces, said at least one plastic material overflow pocket being isolated from said at least one rib groove and being in flow communication with at least one of the net grooves;
   a frame cavity defined by a space between the cavity portion and the core portion, said frame cavity surrounding the net grooves and the at least one rib groove and being in flow communication, with the net grooves and said at least one rib groove, said frame cavity for receiving plastic material for forming the frame of the plastic filter component; and
   at least one adjustable restriction associated with said at least one rib groove so as to control plastic material flow therepast and into at least some of said net grooves.

12. The injection molding die according to claim 11, wherein said net grooves are formed in one of said first and second surfaces and wherein said at least one rib groove and at least one plastic material overflow pocket are formed in the other of said first and second surfaces.

13. The injection molding die according to claim 12, wherein said at least one rib groove comprises a plurality of rib grooves for forming a plurality of supporting ribs of said plastic filter component, each of said plurality of rib grooves being contiguous and in flow communication with a plurality of said net grooves.

14. The injection molding die according to claim 13, wherein the plurality of rib grooves comprises a first set of rib grooves and a second set of rib grooves intersecting at least some of the first set of rib grooves.

15. The injection molding die according to claim 14, wherein the net grooves of said first set and the net grooves of said second set are substantially orthogonal and wherein the rib grooves of said first set and the rib grooves of said second set are substantially orthogonal.

16. The injection molding die according to claim 15, further comprising a plurality of plastic material overflow pockets formed in said second surface at spaced locations.

17. The injection molding die according to claim 16, wherein the rib grooves of said first and second sets divide said second surface into an array of isolated surface portions, selected isolated surface portions comprising at least one plastic material overflow pocket.

18. The injection molding die according to claim 17 wherein each selected isolated surface portion comprises a single plastic material overflow pocket.

19. The injection molding die according to claim 17 wherein said plastic material overflow pockets are semi-spherical recesses formed in said second surface.

20. The injection molding die according to claim 14 wherein the rib grooves of said first and second sets divide said second surface into an array of isolated surface portions, each isolated surface portion being bounded by rib grooves, selected isolated surface portions comprising at least one plastic material overflow pocket isolated from said rib grooves.

21. The injection molding die according to claim 20 wherein each selected isolated surface portion comprises a single plastic material overflow pocket.

22. The injection molding die according to claim 20 wherein said plastic material overflow pockets are semi-spherical recesses formed in said second surface.

23. The injection molding die according to claim 14, wherein said at least one restriction comprises a plurality of axially adjustable damming pins positioned in selected rib grooves.

24. The injection molding die according to claim 14, wherein at least some of said net grooves have cross-sections that are generally parabolic in shape.

25. The injection molding die according to claim 14, further comprising a gate in flow communication with said frame cavity for injecting plastic material into said frame cavity.

26. An injection molding die for a mold for fabricating a plastic filter component comprising a net, supporting ribs, and a frame, the molding die comprising:
- a core portion having a first surface;
- a cavity portion receiving said core portion and having a second surface in abutment with said first surface;
- a plurality of net grooves formed in one of said first and second surfaces, said net grooves comprising a first set of net grooves and a second set of net grooves intersecting at least some of the first set of net grooves, the plurality of net grooves for receiving plastic material for forming the net of the plastic filter component;
- a plurality of rib grooves formed in the other of said first and second surfaces, said rib grooves comprising a first set of rib grooves and a second set of rib grooves intersecting at least some of the first set of rib grooves, said rib grooves dividing the other of said first and second surfaces into a plurality of isolated surface portions bounded by rib grooves, each rib groove being contiguous and in flow communication with a plurality of net grooves, the rib grooves being deeper than said net grooves, said rib grooves for receiving plastic material for forming the supporting ribs of the plastic filter component;
- at least one plastic material overflow pocket formed in at least one of said isolated surface portions, said at least one plastic material overflow pocket being isolated from said rib grooves and being in flow communication with at least one of the net grooves;
- a frame cavity surrounding the net grooves and the rib grooves and being in flow communication with said net grooves and said rib grooves, for receiving plastic material for forming the frame of the plastic filter component; and
- at least one restriction positioned in at least one of said rib grooves to control plastic material flow therepast and into at least some of said net grooves.

27. The injection molding die according to claim 26 wherein the rib grooves of said first and second sets divide said second surface into an array of isolated surface portions, selected isolated surface portions comprising at least one plastic material overflow pocket.

28. The injection molding die according to claim 27 wherein each selected isolated surface portion comprises a single plastic material overflow pocket.

29. The injection molding die according to claim 28 wherein said plastic material overflow pockets are semi-spherical recesses formed in said second surface.

30. The injection molding die according to claim 26, wherein said at least one restriction comprises a plurality of damming pins in selected rib grooves.

31. The injection molding die according to claim 26, wherein the at least one restriction comprises a restriction in the cross-sectional area of selected rib grooves.

32. The injection molding die according to claim 26, wherein the net grooves of said first set and the net grooves of said second set are substantially orthogonal and wherein the rib grooves of said first set and the rib grooves of said second set are substantially orthogonal.

33. The injection molding die according to claim 26, wherein at least some of said net grooves have cross-sections that are generally parabolic in shape.

34. The injection molding die according to claim 26, further comprising a gate in flow communication with said frame cavity for injecting plastic material into said frame cavity.

35. The injection molding die according to claim 4 comprising a plurality of adjustable restrictions, each positioned in a respective one of said rib grooves.

* * * * *

UNITED STATES PATENT AND TRADEMARK OFFICE
CERTIFICATE OF CORRECTION

PATENT NO.       : 7,625,199 B2
APPLICATION NO.  : 10/939631
DATED            : December 1, 2009
INVENTOR(S)      : Jahn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1028 days.

Signed and Sealed this

Twenty-sixth Day of October, 2010

David J. Kappos
*Director of the United States Patent and Trademark Office*